Feb. 13, 1923.
C. HANER, Jr.
APPARATUS FOR OBTAINING POTASH FROM DISTILLERY WASTE BY BURNING THE SAME.
FILED FEB. 19, 1920.
1,444,833.
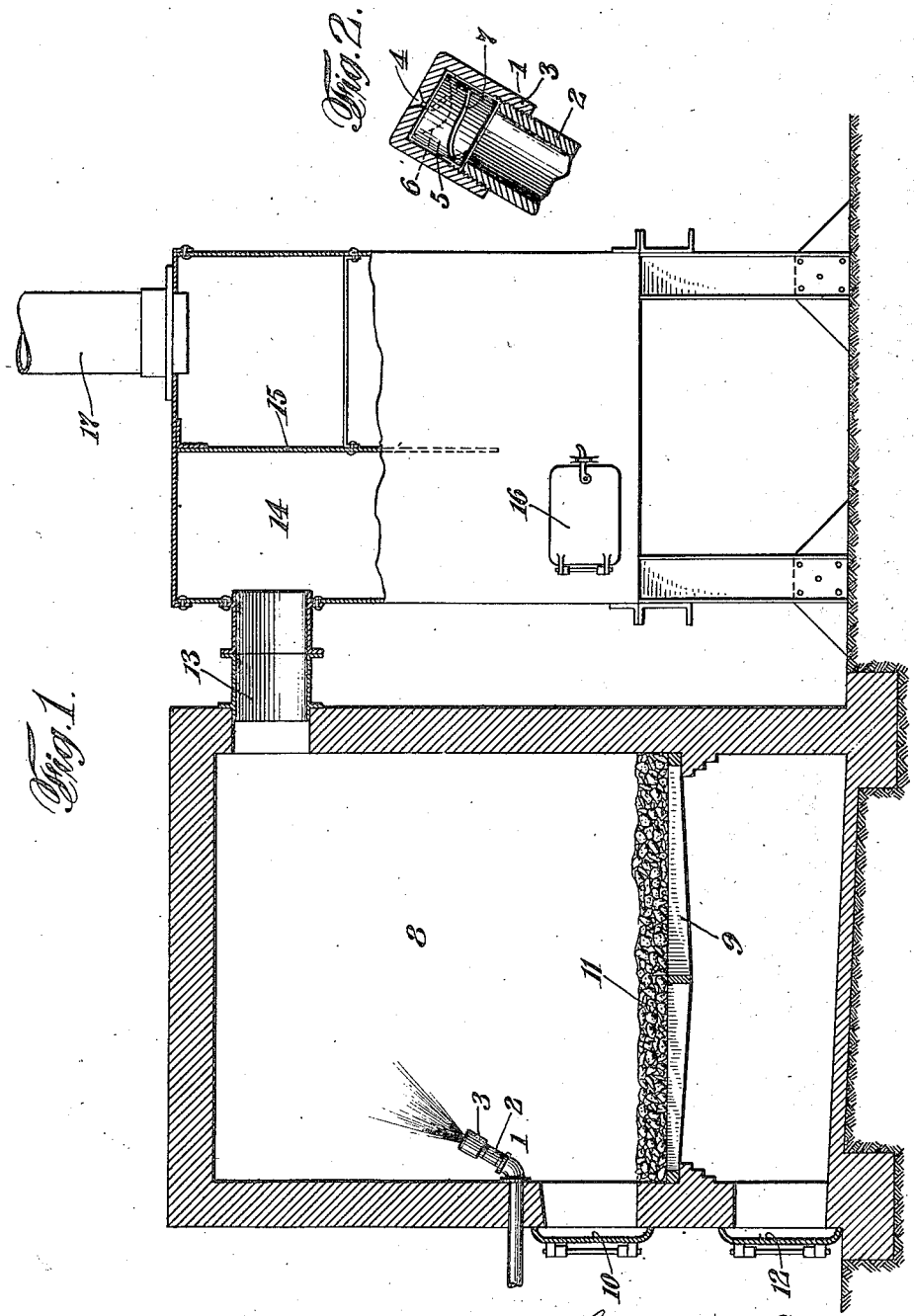

Patented Feb. 13, 1923.

1,444,833

UNITED STATES PATENT OFFICE.

CARL HANER, JR., OF BALTIMORE, MARYLAND, ASSIGNOR TO U. S. INDUSTRIAL ALCOHOL CO., A CORPORATION OF WEST VIRGINIA.

APPARATUS FOR OBTAINING POTASH FROM DISTILLERY WASTE BY BURNING THE SAME.

Application filed February 19, 1920. Serial No. 359,862.

*To all whom it may concern:*

Be it known that I, CARL HANER, Jr., a citizen of the United States, residing at Baltimore, in the State of Maryland, have invented a certain new and useful Improvement in Apparatus for Obtaining Potash from Distillery Waste by Burning the Same, of which the following is a specification.

My invention relates particularly to an apparatus designed for burning distillery waste in order to obtain the potash therefrom in an advantageous manner.

The object of my invention is to provide an apparatus by means of which distillery waste, that is to say the waste or slop which is left after the alcohol has been separated from alcohol producing materials of various kinds which have been subjected to alcohol fermentation. The materials used in such alcohol fermentation may be any of the materials which have been used for the production of alcohol, as for example, molasses. Still another object of my invention is to burn the distillery waste by the aid of the heat produced merely from its own combustion, thus obviating the necessity of consuming other fuels in the production of the potash from the distillery waste.

Further objects of my invention will appear from the detailed description thereof contained hereinafter.

While my invention is capable of being carried out in many different ways, for the purpose of illustration I have shown only one way of carrying out the same in the accompanying drawings, in which:

Fig. 1 is a diagrammatic representation of an apparatus which may be made in accordance with my invention, and Fig. 2 is a cross-section of the nozzle.

Assuming that the material to be treated is the distillery waste obtained from molasses fermentation and the distillation of the fermented molasses, which distillery waste has been concentrated by evaporation to a density of 20 to 35° Bé., the latter is injected in the form of a spray from an upwardly delivering spraying nozzle 1 connected to a slop inlet pipe 2. The nozzle 1 may be any kind of spraying nozzle, but as indicated in the drawings, I have shown for this purpose, a nozzle head 3 interiorly screwthreaded on the pipe 2, and having a spray outlet opening 4, said nozzle head 3 containing within the same a loose plug 5 having a liquid recess 6 in its forward face, and a spiral groove 7 to conduct the liquid forwardly and give it a whirling motion in the recess 6. The slop is injected by the nozzle 1 into a combustion chamber 8, having a plurality of grate bars 9 located close together across the same below a normally closed door 10, adapted for the introduction initially of a small quantity of coal or other fuel for initially heating up the chamber 8, and providing a bed 11 over the grate bars 9. In the combustion chamber below the grate bars 9, there is a cleanout door 12, which is normally open, and from which the potash is removed which falls through the grate bars 9. The potash which falls through the grate bars 9 is formed by the burning of the sprayed slop from the nozzle 1, which projects the liquid particles into the chamber 8, in which they are dried and ignited in falling, and finally burnt upon the grate bars 9, where they form a more or less coherent solid porous mass, and are finally incinerated. The volatile materials, as well as the products of combustion, pass out of the chamber 8 through a passageway 13 to a dust collecting chamber 14 having a baffle plate 15 in the upper portion thereof, and a normally closed cleanout door 16 in the lower portion of the same for the potash dust which accumulates from time to time at this point in the apparatus. The gaseous materials having had the potash dust separated therefrom pass from the dust collecting chamber 14 to a stack 17, which discharges them to the outer air. The potassium compounds which are collected from the lower end of the combustion chamber 8 and the dust collecting chamber 14 are brought together, and may be utilized in any desired manner, as for example, for fertilization of soils or recovery of the potash salts therein, and which comprise among others the following:

Potassium chloride.
Potassium sulphate.
Potassium carbonate.

The operation of my invention will be apparent from the foregoing description, but in general, it will be understood that the concentrated distillery waste in the form of a fine spray is projected upwardly into the chamber 8, so as to secure the maximum burning effect owing to the long path of travel of the particles of the distillery waste. It burns within the chamber 8, thereby providing its own heat for the evaporation of the volatile materials therefrom, as well as the combustion and ignition of the solid materials contained in the same, thus leaving an ash of potassium compounds of the character above referred to, which is mainly recovered from beneath the grate bars 9, but partially also from the dust collecting chamber 14. From time to time during the burning operation, the bed 11 on the grate 9 is rabbled with a bar or poker introduced through the door 10 to facilitate the passage of the ash through the grate 9. Furthermore, although initially as above indicated, a supply of coal or other solid fuel may be ignited on the grate bars 9 to provide heat in the initial operation of the apparatus, it will be understood that such fuel upon the grate bars 9 may be entirely dispensed with, and the spray ignited in any other desired manner, as for example, by the introduction and burning of a quantity of oil initially, or by the initial heating in any other way of the combustion chamber 8 to a temperature sufficient to ignite a spray of distillery waste. In fact, the heating of the chamber 8 to the desired ignition temperature may have been accomplished by the burning therein previously of another quantity of the distillery waste.

While I have described my invention above in detail, I wish it to be understood that many changes may be made therein without departing from the spirit thereof.

I claim:

1. An apparatus for burning distillery slop and similar materials comprising a tall and capacious combustion chamber, a door therefor, an exit thereto opposite the door at the upper end of the chamber, a sprayer positioned above the door and constructed to deliver spray towards the top of the chamber with a whirling motion, and means for removing ash from the chamber.

2. An apparatus for burning distillery slop and similar materials comprising a tall and capacious combustion chamber, a door therefor, an exit for vapors and dust, a sprayer positioned to deliver spray towards the top of the chamber with a whirling motion, and means for removing ash from the chamber.

3. An apparatus for burning distillery slop and similar materials comprising a tall and capacious combustion chamber, a door therefor, an exit for dust and vapors, a sprayer positioned to deliver spray towards the upper part of the chamber with a whirling motion, grate bars for receiving particles from the spray, and means for removing ash from the chamber.

4. An apparatus for burning distillery slop and similar materials comprising a tall and capacious combustion chamber, a door therefor, a short conduit leading to a separating chamber for vapors and dust, a sprayer positioned to deliver distillery slop spray into the chamber towards the top thereof with a whirling motion so as to provide a long path of travel for the spray particles, and means for removing ash from the chamber.

5. An apparatus for burning distillery slop and similar materials comprising a tall and capacious combustion chamber, a door therefor, a sprayer positioned in the chamber to delivery distillery slop spray thereinto with a whirling motion, grate bars in the lower part of the chamber, and means for removing ash from the chamber.

6. An apparatus for burning distillery slop and similar materials comprising a tall and capacious combustion chamber, a door therefor, a short conduit leading to a separating chamber, for vapors and dust, a sprayer positioned in the chamber to deliver a spray thereinto, grate bars below the sprayer, and means for removing ash from the chamber.

7. An apparatus for burning distillery slop and similar materials comprising a tall and capacious combustion chamber, a door therefor at the side of the chamber, an exit for vapors and dust opposite the door, a sprayer positioned above the door for delivering a distillery slop spray upwardly into the chamber, and grate bars in the lower part of the chamber to receive the spray from the sprayer.

8. An apparatus for burning distillery slop and similar materials comprising a tall and capacious combustion chamber, a door therefor, a sprayer positioned in the chamber to deliver spray upwardly therein with a whirling motion and grate bars beneath the sprayer to receive falling spray.

In testimony that I claim the foregoing, I have hereunto set my hand this 20th day of January, 1920.

CARL HANER, Jr.